(12) United States Patent
Chen et al.

(10) Patent No.: US 11,973,812 B2
(45) Date of Patent: Apr. 30, 2024

(54) VIDEO CONTROL METHOD, VIDEO CONFERENCE TERMINAL AND MULTI-POINT CONTROL UNIT (MCU)

(71) Applicant: XI'AN ZHONGXING NEW SOFTWARE CO., LTD., Xi'an (CN)

(72) Inventors: Yunzheng Chen, Shenzhen (CN); Dalin Wang, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 697 days.

(21) Appl. No.: 17/105,348

(22) Filed: Nov. 25, 2020

(65) Prior Publication Data
US 2021/0084084 A1    Mar. 18, 2021

Related U.S. Application Data

(63) Continuation of application No. PCT/CN2019/088029, filed on May 22, 2019.

(30) Foreign Application Priority Data

May 25, 2018    (CN) .......................... 201810517757.6

(51) Int. Cl.
*H04L 65/403*    (2022.01)
*G06V 40/16*    (2022.01)
(Continued)

(52) U.S. Cl.
CPC .......... *H04L 65/403* (2013.01); *G06V 40/161* (2022.01); *G06V 40/166* (2022.01);
(Continued)

(58) Field of Classification Search
CPC . H04L 65/403; H04L 65/4038; H04L 65/611; H04L 65/75; H04L 65/762;
(Continued)

(56) References Cited

U.S. PATENT DOCUMENTS

| | | | | |
|---|---|---|---|---|
| 8,451,315 B2 * | 5/2013 | Lee | ......................... | H04N 7/142 348/14.09 |
| 8,908,005 B1 * | 12/2014 | Leske | ................... | H04L 65/611 348/14.09 |

(Continued)

FOREIGN PATENT DOCUMENTS

| | | |
|---|---|---|
| CN | 101295322 A | 10/2008 |
| CN | 102025970 A | 4/2011 |

(Continued)

OTHER PUBLICATIONS

ZTE Corporation, CN First Office Action, CN201810517757.6, dated Apr. 14, 2021, 14 pgs.

(Continued)

*Primary Examiner* — Nay A Maung
*Assistant Examiner* — Jose M Torres
(74) *Attorney, Agent, or Firm* — Vivacqua Crane, PLLC

(57) ABSTRACT

Embodiments of the present application provide a video control method, a video conference terminal and a multi-point control unit (MCU). The method comprises: performing human facial recognition on a video code stream and determining a motion quantity of the video code stream; sorting identifiers P and motion quantities R respectively corresponding to a plurality of video code streams; and selecting video code streams corresponding to video conference terminals ranked top M for synthesis and output and/or selecting a video conference terminal corresponding to a video code stream ranked first as a broadcast source.

16 Claims, 6 Drawing Sheets

(51) Int. Cl.
  *H04L 65/4038* (2022.01)
  *H04L 65/611* (2022.01)
  *H04L 65/75* (2022.01)
  *H04N 7/14* (2006.01)
  *H04N 7/15* (2006.01)
(52) U.S. Cl.
  CPC .......... *G06V 40/172* (2022.01); *G06V 40/173* (2022.01); *H04L 65/4038* (2013.01); *H04L 65/611* (2022.05); *H04L 65/75* (2022.05); *H04L 65/762* (2022.05); *H04N 7/147* (2013.01); *H04N 7/15* (2013.01); *H04N 7/152* (2013.01)
(58) Field of Classification Search
  CPC .. G06V 40/161; G06V 40/166; G06V 40/172; G06V 40/173; H04N 7/147; H04N 7/15; H04N 7/152
  See application file for complete search history.

(56) References Cited

U.S. PATENT DOCUMENTS

| | | | | |
|---|---|---|---|---|
| 9,743,042 | B1* | 8/2017 | Faulkner | H04L 65/403 |
| 10,136,102 | B2* | 11/2018 | Dalvi | H04L 12/4625 |
| 10,567,448 | B2* | 2/2020 | Bader-Natal | H04L 65/403 |
| 10,863,227 | B2* | 12/2020 | Faulkner | H04N 21/4316 |
| 2002/0101505 | A1* | 8/2002 | Gutta | H04N 7/15 348/E7.083 |
| 2002/0105598 | A1* | 8/2002 | Tai | H04N 7/15 348/E7.083 |
| 2005/0265581 | A1* | 12/2005 | Porter | G06V 40/173 382/103 |
| 2008/0084900 | A1* | 4/2008 | Dunn | H04N 21/6547 375/E7.014 |
| 2008/0218586 | A1* | 9/2008 | Graham | H04M 3/569 348/14.09 |
| 2010/0002069 | A1* | 1/2010 | Eleftheriadis | H04N 21/654 348/14.08 |
| 2011/0093273 | A1* | 4/2011 | Lee | H04L 65/4038 348/E7.083 |
| 2012/0127262 | A1* | 5/2012 | Wu | H04N 7/152 348/14.09 |
| 2014/0176663 | A1 | 6/2014 | Cutler et al. | |
| 2014/0184731 | A1* | 7/2014 | Bebbington | H04N 7/152 348/14.09 |
| 2015/0009276 | A1* | 1/2015 | Maxwell | H04N 5/144 348/14.07 |
| 2015/0296178 | A1* | 10/2015 | Aarrestad | G06V 40/166 348/14.16 |
| 2017/0244930 | A1 | 8/2017 | Faulkner | |
| 2017/0339417 | A1* | 11/2017 | Puri | G06F 18/2178 |

FOREIGN PATENT DOCUMENTS

| | | |
|---|---|---|
| CN | 102833518 A | 12/2012 |
| CN | 103347165 A | 10/2013 |
| CN | 104247407 A | 12/2014 |
| CN | 104954730 A | 9/2015 |
| CN | 106134188 A | 11/2016 |
| CN | 106165406 A | 11/2016 |
| CN | 107277427 A | 10/2017 |
| JP | 2008-294724 A | 12/2008 |

OTHER PUBLICATIONS

ZTE Corporation, Extended European Search Report, EP19807794.3, dated Jun. 24, 2021, 8 pgs.

ZTE Corporation, International Search Report, PCT/CN2019/088029, dated Aug. 22, 2019, 9 pgs.

* cited by examiner

VIDEO CONTROL METHOD, VIDEO CONFERENCE TERMINAL AND MULTI-POINT CONTROL UNIT (MCU)

CROSS-REFERENCES TO RELATED APPLICATIONS

The present application is a continuation of PCT Patent Application No. PCT/CN2019/088029, filed May 22, 2019, which claims the benefit of priority to Chinese patent application No. 201810517757.6, filed May 25, 2018, each of which is hereby incorporated by reference in its entirety.

TECHNICAL FIELD

Embodiments of the present application relate to, but are not limited to, the field of video conference, and more specifically to a video control method, a video conference terminal, and a multi-point control unit (MCU).

BACKGROUND

The current multimedia communication technology is widely used in various fields, such as video conference, distance education and so on. As the system functions become more and more powerful, users not only have higher requirements for audio-visual quality, but also put forward more and more intelligent requirements for human-computer interaction. Among them, the video conference system refers to that two or more individuals or groups in different places distribute static and dynamic images of a person, voices, texts, pictures and other materials to computers of respective users through the existing various telecommunication transmission media, such that users geographically dispersed can gather together to exchange information through graphics, sound and other methods, so that the ability of both parties to understand the contents are increased.

Video control, such as video switching, is one of the important functions of the conference control system.

In the related multi-point conference control mode, the user needs to manually apply for speaking or become a broadcast source through voice control, and the chairman needs to manually select the broadcast source, manually select the conference venue for timed round-robin, etc. Performing video switching through manual mode or voice control results in a cumbersome process of video switching and an inconvenient operation, which may result bad user experience. In practical applications, the number of terminals participating in the conference in a multi-point video conference may be very large, and performing video switching through manual mode or voice control will lead to a disorganized management of the conference venues.

SUMMARY

In view of this, some embodiments of the present application provide a video control method applied to a video conference terminal, comprising:
  uploading a video code stream to a multi-point control unit (MCU);
  performing human facial recognition on the video code stream and determining a motion quantity R of the video code stream, and using an identifier P to indicate whether there is a person in the video code stream or not;
  sending the identifier P and the motion quantity R of the video code stream to the MCU, such that the MCU performs video synthesis and output, and/or selects a broadcast source.

Some embodiments of the present application also provide a video control method applied to a multi-point control unit (MCU), comprising:
  receiving video code streams respectively sent by a plurality of video conference terminals;
  receiving identifiers P and motion quantities R respectively corresponding to the video code streams sent by the plurality of video conference terminals, the identifier P indicating whether there is a person in the corresponding video code stream or not;
  sorting the identifiers P and the motion quantities R respectively corresponding to the video code streams, and selecting video code streams corresponding to the video conference terminals ranked top M for synthesis and output, and/or selecting a video conference terminal corresponding to a video code stream ranked first as a broadcast source.

Some embodiments of the present application also provide a video control method applied to a multi-point control unit (MCU), comprising:
  receiving video code streams respectively uploaded by a plurality of video conference terminals;
  performing human facial recognition on each of the uploaded video code streams and determining a motion quantity R for each of the video code streams, where each of the video code streams uses its own identifier P to indicate whether there is a person in the video code stream or not;
  sorting the identifiers P and the motion quantities R respectively corresponding to the video code streams, and selecting video code streams ranked top M for synthesis and output, and/or selecting a video conference terminal corresponding to a video code stream ranked first as a broadcast source.

Some embodiments of the present application also provide a video conference terminal, comprising:
  a first sending unit configured to upload a video code stream to a multi-point control unit (MCU);
  an identification and determination unit configured to perform human facial recognition on the video code stream and determine a motion quantity R of the video code stream, and use an identifier P to indicate whether there is a person in the video code stream or not;
  a second sending unit configured to send the identifier P and the motion quantity R of the video code stream to the MCU, such that the MCU perform video synthesis and output, and/or select a broadcast source.

Some embodiments of the present application also provide a multi-point control unit (MCU), comprising:
  a first receiving unit configured to receive video code streams respectively sent by a plurality of video conference terminals;
  a second receiving unit configured to receive identifiers P and motion quantities R respectively corresponding to the video code streams sent by the plurality of video conference terminals, the identifier P indicating whether there is a person in the corresponding video code stream or not;
  a sorting unit configured to sort the identifiers P and the motion quantities R respectively corresponding to a plurality of video code streams;
  a selection unit, configured to select video code streams corresponding to the video conference terminals ranked top M for synthesis and output, and/or select a video conference terminal corresponding to a video code stream ranked first as a broadcast source.

Some embodiments of the present application also provide a multi-point control unit (MCU), comprising:
a first receiving unit configured to receive video code streams respectively uploaded by a plurality of video conference terminals;
a recognition and determination unit configured to perform human facial recognition on each of the uploaded video code streams and determine a motion quantity R of each of the video code streams, where each of the video code streams uses its own identifier P to indicate whether there is a person in the video code stream or not;
a sorting unit configured to sort the identifiers P and the motion quantities R respectively corresponding to a plurality of video code streams;
a selection unit configured to select video code streams ranked top M for synthesis and output, and/or select a video conference terminal corresponding to a video code stream ranked first as a broadcast source.

Some embodiments of the present application also provides a video conference terminal, comprising a memory, a processor, and a computer program stored on the memory and run on the processor, when executed by the processor, the computer program implements the video control method of any one of above.

Some embodiments of the present application also provide a multi-point control unit (MCU), comprising a memory, a processor, and a computer program stored on the memory and run on the processor, when executed by the processor, the computer program implements the video control method of any one of above.

The embodiments of the present application also provide a computer-readable storage medium storing an information processing program that, when executed by a processor, implements steps of the video control method of any one of above.

The technical solutions provided by some embodiments of this application include performing the human facial recognition on a video code stream and determining a motion quantity of the video code stream, sorting identifiers P and motion quantities R respectively corresponding to a plurality of video code streams, and selecting the video code streams corresponding to video conference terminals ranked top M for synthesis and output and/or selecting a video conference terminal corresponding to a video code stream ranked first as a broadcast source. In this way, there is no need for manual intervention when performing video control in a video conference, and the video synthesis and output is automatically performed or the broadcast source is selected based on human facial recognition and motion quantity of the video code stream, which is easy to operate, reduces the complexity of human operations, increases the efficiency of video control, improves the user experience and avoids the disorganized management of the conference venue.

Other features and advantages of the present application will be described in the following description, and partly become obvious from the description, or understood by implementing the present application. The purposes and other advantages of the application can be realized and obtained through the structures specifically pointed out in the description, claims and drawings.

BRIEF DESCRIPTION OF THE DRAWINGS

The accompanying drawings are used to provide a further understanding of the technical solution of the present application, which constitute a part of the specification. The drawings, together with the embodiments of the present application, are used to explain the technical solution of the present application, but do not constitute a limitation to the technical solution of the present application.

DETAILED DESCRIPTION

Figure 1:
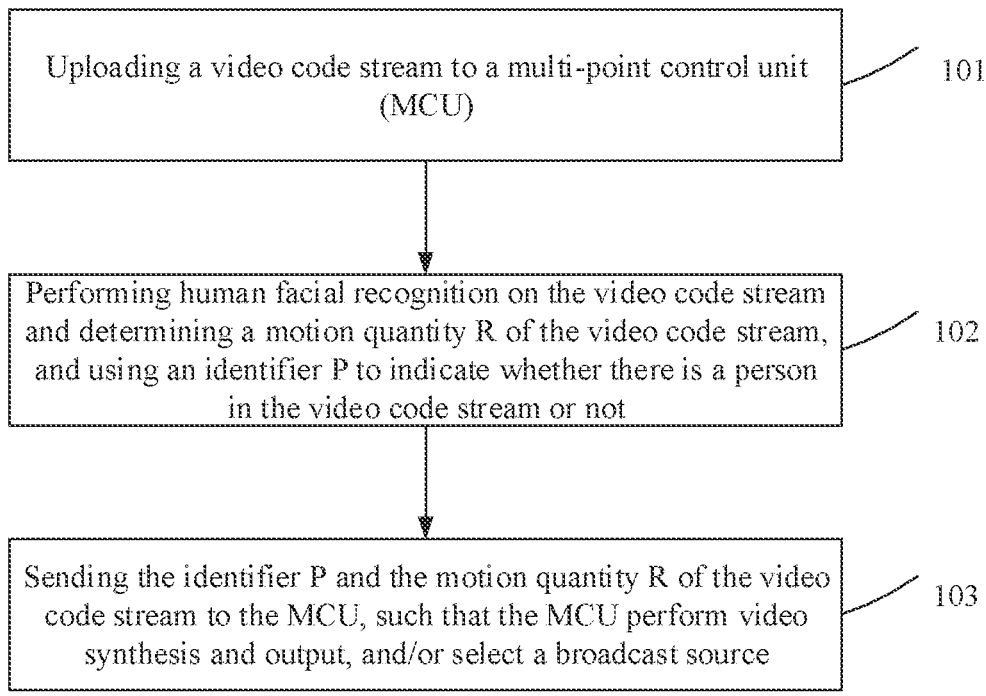
FIG. 1 is a schematic flowchart illustrating a video control method according to an embodiment of this application.

In order to make the purposes, technical solutions, and advantages of the present application more clear, the embodiments of the present application will be described in detail below in conjunction with the accompanying drawings. It should be noted that the embodiments in this application and the features in the embodiments may be combined with each other arbitrarily when there is no conflict.

The steps shown in the flowchart of the drawings may be executed in a computer system such as a set of computer-executable instructions. And, although a logical sequence is shown in the flowchart, in some cases, the steps shown or described may be performed in a different order.

In the related art, a multi-point video conference system mainly includes a plurality of video conference terminals and a multi-point control unit (MCU). Usually, the plurality of terminals are collectively connected to one MCU. The MCU is an indispensable and important part of the video conference system, and it is a main equipment to realize the information exchange and control between the participating terminals. All participating terminals are connected to the MCU through a standard interface, and the user manually or automatically triggers to establish a multi-point call conference with the multi-point control unit (MCU). After the video conference is established, the video and audio of the participating terminals are sampled, compressed, and encoded in the image format through local video and audio encoders, and then transmitted to the multi-point control unit (MCU) through a negotiated media transmission channel. The MCU performs exchange and mixing of images and voices according to international standards H.221, H.242, H.243, T.120 and other protocols, and realizes control of all terminals and other related functions. Among them, video control is one of the important functions of the conference control system.

The embodiments of the application provide a video control method, a video conference terminal, and a multi-point control unit (MCU). The method comprises: extracting N frames of images from the video code stream and saving them in a buffer; performing human facial recognition on the N frames of images, and using the identifier P to indicate whether there is a person in the N frames of images or not; determining, according to the N frames of images, the motion quantity R of the video conference terminal corresponding thereto; sorting the identifiers P and the motion quantities R respectively corresponding to a plurality of video conference terminals, and selecting the video code streams corresponding to the video conference terminals ranked top M for synthesis and output or selecting a video conference terminal ranked first as a broadcast source. In this way, there is no need for manual intervention when performing video control in a video conference, and the video synthesis and output is automatically performed or the broadcast source is selected based on human facial recognition and motion quantity of the video code stream, which is easy to operate, reduces the complexity of human operations, increases the efficiency of video control, improves the user experience and avoids the disorganized management of the conference venues.

The technical solution of the present application will be described in detail below through specific embodiments.

FIG. 1 is a schematic flowchart illustrating a video control method according to an embodiment of this application. As shown in FIG. 1, the method is applied to a video conference terminal, which comprises:

Step 101: uploading a video code stream to a multi-point control unit (MCU);

Before uploading the video code stream to the MCU, the video conference terminal has established a video conference connection with the MCU.

Step 102: performing human facial recognition on the video code stream and determining a motion quantity R of the video code stream, and using an identifier P to indicate whether there is a person in the video code stream or not;

In some embodiments, performing the human facial recognition on the video code stream and determining the motion quantity R of the video code stream may comprise:
  extracting N frames of images from the video code stream and saving them in a buffer;
  performing the human facial recognition on the N frames of images, and using the identifier P to indicate whether there is a person or not in the N frames of images or not;
  determining, according to the N frames of images, the motion quantity R of the video code stream corresponding thereto.

A variety of existing human facial recognition algorithms may be used to perform human facial recognition on the video code stream, and the specific human facial recognition process is commonly known, and thus will not be repeated herein.

Where, extracting the N frames of images from the video code stream comprises:
  extracting y frames from every x seconds of video in the video code stream for z times continuously, where y*z=N, and x, y and z are all natural numbers greater than or equal to 1.

Where, performing the human facial recognition on the N frames of images comprises:
  performing the human facial recognition on one or more of the N frames of images, and if there is a person in any one of the one or more of the frames of images, determining that there is a person in the N frames of images;
  and/or,
  if there is no person in any one of the one or more of the frames of images, determining that there is no person in the N frames of images.

Using the identifier P to indicate whether there is a person in the N frames of images or not may comprise:
  If there is a person in the N frames of images, assigning a value of 1 to the identifier P of the video code stream, and if there is no person in the N frames of images, assigning a value of 0 to the identifier P.

Where, determining, according to the N frames of images, the motion quantity R of the video code stream corresponding thereto comprises:
  analyzing the N frames of images buffered in the buffer to obtain x*z seconds of the motion quantity of the video code stream, as the motion quantity R of the video code stream.

A variety of existing motion calculation algorithms may be used to calculate the motion quantity of the video code stream, and the specific motion quantity calculation process is the prior art, which will not be repeated here.

Before extracting the N frames of images from the video code stream and saving them in the buffer, the method further comprises:
  applying for a buffer that is capable of saving the N frames of images.

Step 103: sending the identifier P and the motion quantity R of the video code stream to the MCU, where the identifier P and the motion quantity R are used for the MCU to perform video synthesis and output or select a broadcast source.

The technical solution provided by the embodiments of this application performs the human facial recognition on the uploaded video code stream, determines the motion quantity R of the video code stream, and sends the identifier P and the motion quantity R of the video code stream to the MCU, such that the MCU performs Video synthesis and output or selects a broadcast source. In this way, it is convenient for the MCU to automatically perform video synthesis and output or select the broadcast source based on the human facial recognition on the video code stream and the motion quantity of the video code stream, and there is no need for manual intervention, which is easy to operate, reduces the complexity of human operations, increases the efficiency of video control, improves the user experience and avoids the disorganized management of the conference venues.

Figure 2:
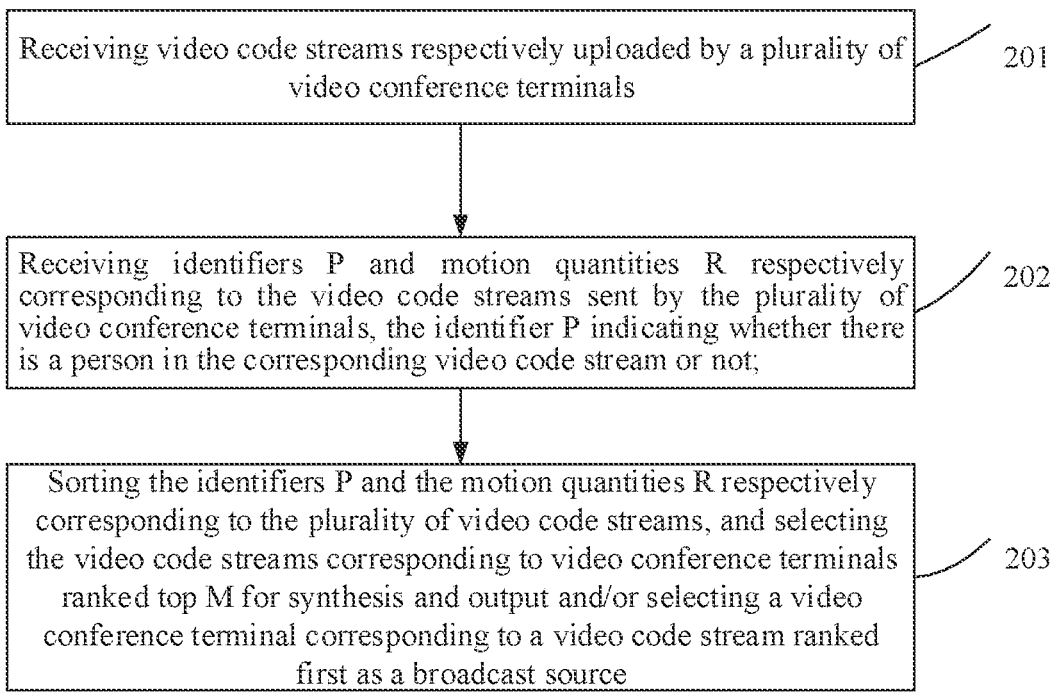
FIG. 2 is a schematic flowchart illustrating a video control method according to an embodiment of this application.

FIG. 2 is a schematic flowchart illustrating a video control method according to an embodiment of this application. As shown in FIG. 2, the method applied to a multi-point control unit (MCU) comprises:

Step 201: receiving video code streams respectively sent by the plurality of video conference terminals;

Before receiving the video code streams respectively sent by the plurality of video conference terminals, the MCU has established a video conference connection with the video conference terminal.

Step 202: receiving identifiers P and motion quantities R respectively corresponding to the video code streams sent by the plurality of video conference terminals, using the identifier P to indicate whether there is a person in the video code stream or not;

The specific ways described in the above embodiments may be employed by the video conference terminal to determine the identifier P and the motion quantity R corresponding to the video code stream uploaded.

Step 203: sorting the identifiers P and the motion quantities R respectively corresponding to the plurality of video code streams, and selecting the video code streams corresponding to video conference terminals ranked top M for synthesis and output and/or selecting a video conference terminal corresponding to a video code stream ranked first as a broadcast source.

According to an embodiment, rules for the sorting include but not limited to: the video code stream in which there is a person is ranked higher than the video code stream having no person therein; if each of the video code streams has a person therein, the higher the value of the motion quantity R is, the higher the rank is.

In some embodiments, if there is a person in the video code stream, a value of 1 is assigned to the identifier P of the video code stream, and if there is no person in the video code stream, a value of 0 is assigned to the identifier P of the video code stream. The sorting rules may include: a video code stream in which P=1 is ranked higher than a video code stream in which P=0; if P=1 for all of the video code streams, the higher the value of R is, the higher the rank is.

In the technical solution provided by the embodiments of this application, when there are many conference venues (video conference terminals), the MCU or cloud server can intelligently synthesize and output the top M video code streams without manual inspection selection; or take the video code stream ranked first as the broadcast source without manual intervention, which is easy to operate, reduces the complexity of human operations, increases the efficiency of video control, improves the user experience and avoids the disorganized management of the conference venues.

In the technical solution provided by the embodiments of the present application, N frames of images may be extracted from the uploaded video code stream and saved in the buffer, and the human facial recognition may be performed on the buffered N frames of images to realize the human facial recognition of the video code stream. In one embodiment, extracting the N frames of images from the video code stream may include extracting y frames from every x seconds of video in each of the video code streams for z times continuously, where y*z=N, and x, y and z are all positive integers; and performing the human facial recognition on the buffered N frames of images may include performing the human facial recognition on one or more of the N frames of images.

The third embodiment of the present application will be described by taking the following as an example: one frame is taken in 1 second and a total of 20 frames of images are taken and put into the buffer, and the human facial recognition is performed on the first frame of the saved 20 frames of images.

Figure 3:
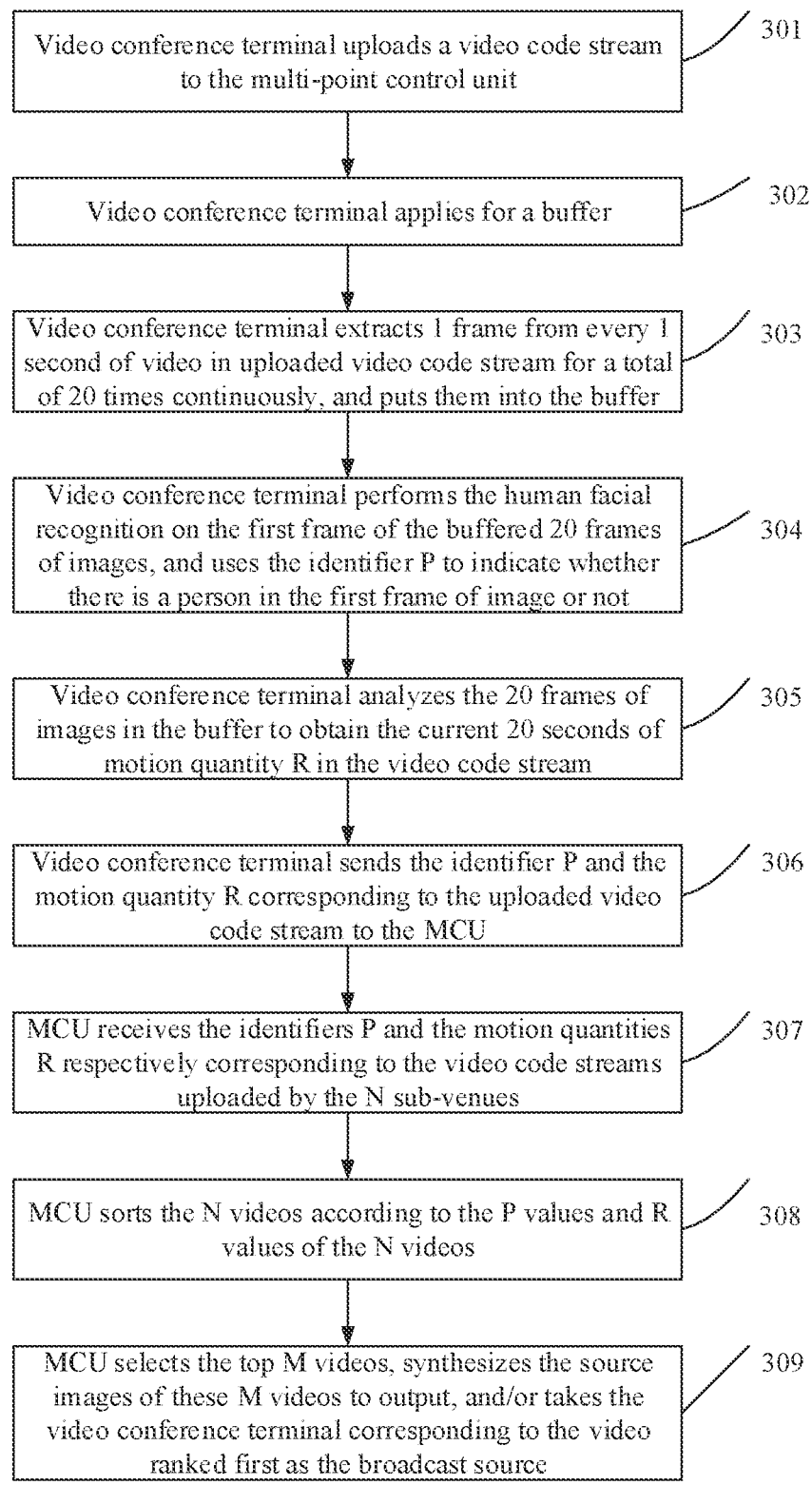
FIG. 3 is a schematic flowchart illustrating a video control method according to an embodiment of the application.

FIG. 3 is a schematic flowchart illustrating a video control method according to an embodiment of the application. As shown in FIG. 3, the video control method comprises:

At Step 301, the video conference terminal uploads a video code stream to the multi-point control unit (MCU);

Before uploading the video code stream to the multi-point control unit (MCU), the video conference terminal has established a multi-point video conference connection with the MCU.

In the third embodiment, the multi-point video conference has a total of N sub-venues, and all of the N video conference terminals have established conference connections with the MCU.

Step 302: the video conference terminal applies for a buffer;

In this embodiment, a buffer that is capable of saving at least 20 frames of images is required, so the terminal applies for a buffer that can buffer 20 frames of images.

The above steps 301 and 302 do not have a fixed sequence. The video conference terminal may apply for a buffer that can save at least 20 frames of images at the beginning of joining a multi-point video conference. The video conference terminal may also temporarily apply for a buffer that can save at least 20 frames during the multi-point video conference.

Step 303: the video conference terminal extracts 1 frame from every 1 second of video of the uploaded video code stream for a total of 20 times continuously, and puts them into the buffer;

In this embodiment, the YUV data before encoding may be collected and 1 frame may be extracted from every 1 second of video and put into the buffer, such operation may be performed for 20 times, and thus a total of 20 frames of images are put into the buffer;

Step 304: the video conference terminal performs the human facial recognition on the first frame of the buffered 20 frames of images, and uses the identifier P to indicate whether there is a person in the first frame of image or not;

The human facial recognition may be performed on one or more of the buffered 20 frames of images. In this embodiment, the human facial recognition is performed on the first frame of image, and the existing human facial recognition algorithm may be used to perform the human facial recognition on the first frame of image.

Specifically, if there is a person in the first frame of image, P=1, otherwise P=0;

When the human facial recognition is performed on a plurality of the buffered 20 frames of images, if there is a person in any one of the plurality of frames of images, it is determined that there is a person in the N frames of images, P=1; and if there is no person in any one of the plurality of frames of images, it is determined that there is no person in the N frames of images, P=0.

Step 305: the video conference terminal analyzes the 20 frames of images in the buffer to obtain the current 20 seconds of motion quantity R in the video code stream:

Various existing motion calculation algorithms may be used to calculate the motion quantity of the video code stream. For example, in the third embodiment, the specific process of calculating the motion quantity R is:

calculating, in blocks, sad values of two YUV image blocks (this block may be an image block of m*m size). The sad value refers to the sum of the absolute value of the difference between the values of two image blocks at the same pixel. The average value R of the sad values of each two adjacent frames of images in the 20 frames of images stored in the buffer is calculated in blocks. The larger the R value is, the greater the 20 seconds of motion quantity of the image is.

Step 306: the video conference terminal sends the identifier P and the motion quantity R corresponding to the uploaded video code stream to the MCU;

The video conference terminal may simultaneously send the latest determined identifier P and the motion quantity R to the MCU each time the video code stream is uploaded.

Step 307: the MCU receives the identifiers P and the motion quantities R respectively corresponding to the video code streams uploaded by the N sub-venues;

In a multi-point video conference, a plurality of video conference terminals are connected with the MCU for conference. In addition to receiving the video code streams of respective sub-venues, the MCU receives the identifiers P and the motion quantities R respectively corresponding to the uploaded video code streams sent by respective sub-venues.

Step 308: the MCU sorts the N videos according to the P values and R values of the N videos;

The rules for sorting include: the video code stream having a person therein is ranked higher than the video code stream having no person therein; if each of the video code streams has a person therein, the higher the value of the motion quantity R is, the higher the rank is.

In this embodiment, the rules for sorting include: the video in which P=1 is ranked higher than the video in which P=0, that is to say, the video having a person therein is ranked higher than the video having no person therein. If all videos have a person therein, the R values are compared, and the higher the R value is, the higher the rank is.

In step 309: the MCU selects the top M videos, synthesizes the source images of these M (1≤M≤N) videos to output, and/or takes the video conference terminal corresponding to the video ranked first as the broadcast source.

In the technical solution provided by the embodiments of this application, when N is very large, the MCU or cloud server can intelligently synthesize and output M videos without manual inspection selection; the video conference terminal corresponding to the video ranked first in the N videos may be taken as the broadcast source without manual intervention, which is easy to operate, reduces the complexity of human operations, increases the efficiency of video control, improves the user experience and avoids the disorganized management of the conference venue.

Figure 4:
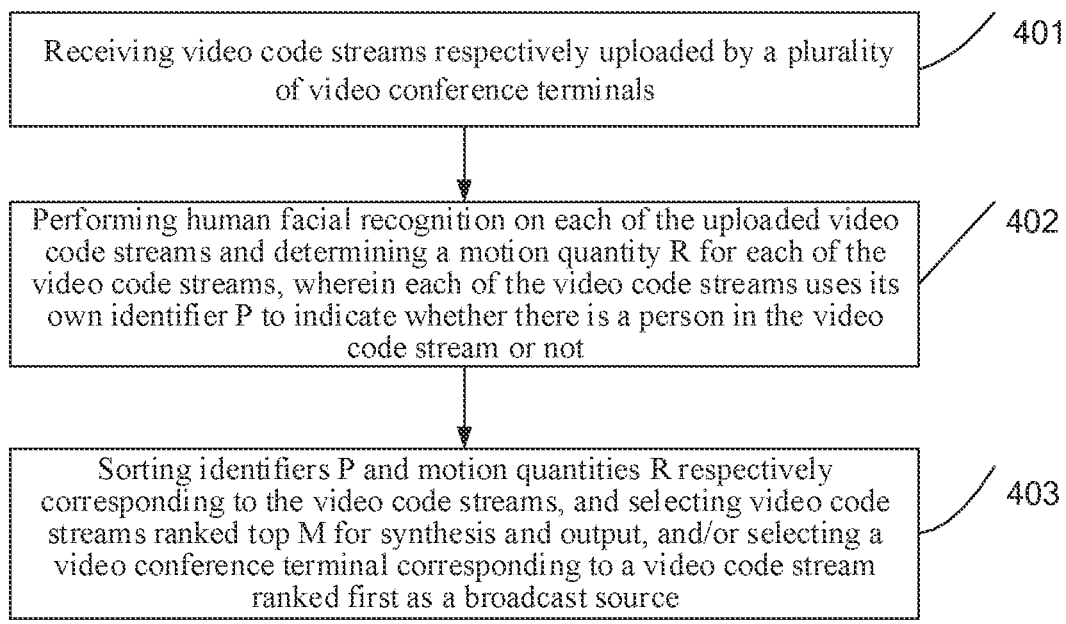
FIG. 4 is a schematic flowchart illustrating a video control method according to an embodiment of this application.

FIG. 4 is a schematic flowchart illustrating a video control method according to an embodiment of this application. As shown in FIG. 4, the method is applied to a multi-point control unit (MCU), and the method comprises:

Step 401: receiving video code streams respectively uploaded by a plurality of video conference terminals;

The MCU has established a video conference connection with the video conference terminals before receiving the video code streams respectively sent by the plurality of video conference terminals.

Step 402: performing the human facial recognition on each of the uploaded video code streams and determining a motion quantity R for each of the video code streams, where each of the video code streams uses its own identifier P to indicate whether there is a person in the video code stream or not:

A variety of existing human facial recognition algorithms may be used to perform the human facial recognition on the video code stream, and the specific human facial recognition process is commonly known, which will not be repeated herein.

Performing the human facial recognition on each of the uploaded video code streams and determining the motion quantity R of each of the video code streams comprises:

extracting N frames of images from each of the video code streams and saving them in a buffer; performing the human facial recognition on the N frames of images, and using the identifier P to indicate whether there is a person in the N frames of images or not;

determining, according to the N frames of images, the motion quantity R of the video code stream corresponding thereto.

In one embodiment, extracting the N frames of images from each of the video code streams comprises:

extracting y frames from every x seconds of video in each of the video code streams for z times continuously, where y*z=N, and x, y and z are all positive integers.

Before extracting the N frames of images from each of the video code streams and saving them in the buffer, the method further comprises:

applying for a buffer that is capable of saving the N frames of images for each of the video conference terminals.

Performing the human facial recognition on the N frames of images comprises:

performing the human facial recognition on one or more of the N frames of images, and if there is a person in any one of the one or more of the frames of images, determining that there is a person in the N frames of images; if there is no person in any one of the one or more of the frames of images, determining that there is no person in the N frames of images.

Using the identifier P to indicate whether there is a person in the N frames of images or not comprises:

if there is a person in the N frames of images, assigning a value of 1 to the identifier P of the video code stream, and if there is no person in the N frames of images, assigning a value of 0 to the identifier P.

Determining, according to the N frames of images, the motion quantity R of the video code stream corresponding thereto comprises:

analyzing the buffered N frames of images to obtain x*z seconds of the motion quantity of the corresponding video code stream, as the motion quantity R of the corresponding video code stream.

A variety of existing motion calculation algorithms may be used to calculate the motion quantity of the video code stream, and the specific motion quantity calculation process is commonly known, which will not be repeated herein.

Step 403: sorting the identifiers P and the motion quantities R respectively corresponding to a plurality of video code streams, and selecting the video code streams ranked top M for synthesis and output and/or selecting a video conference terminal corresponding to a video code stream ranked first as a broadcast source.

Rules for the sorting include: the video code stream having a person therein is ranked higher than the video code stream having no person therein; if each of the video code streams has a person therein, the higher the value of the motion quantity R is, the higher the rank is.

Specifically, rules for the sorting include: the video code stream in which P=1 is ranked higher than the video code stream in which P=0; if P=1 for all of the video code streams, the higher the value of R is, the higher the rank is.

In the technical solution provided by the fourth embodiment, when there are many conference venues (video conference terminals), the MCU or cloud server can intelligently synthesize and output the top M video code streams without manual inspection selection; or take the video code stream ranked first as the broadcast source without manual intervention during video control, which is easy to operate, reduces the complexity of human operations, increases the efficiency of video control, improves the user experience and avoids the disorganized management of the conference venues.

In the technical solution provided by the embodiments of the present application, N frames of images may be extracted from each of the uploaded video code streams and saved in the buffer, and the human facial recognition may be performed on the buffered N frames of images to realize the human facial recognition of the video code stream. Extracting N frames of images from the video code stream may include extracting y frames from every x seconds of video in the video code stream for z times continuously, where y*z=N, and x, y and z are all positive integers. Performing the human facial recognition on the buffered N frames of images may include performing the human facial recognition on one or more of the N frames of images.

In the embodiment of the present application, the description is made by taking the following as an example: one frame is taken in 1 second and a total of 20 frames of images are put into the buffer, and human facial recognition is performed on the first frame of the saved 20 frames of images is taken as an example, which is only an example.

Figure 5:
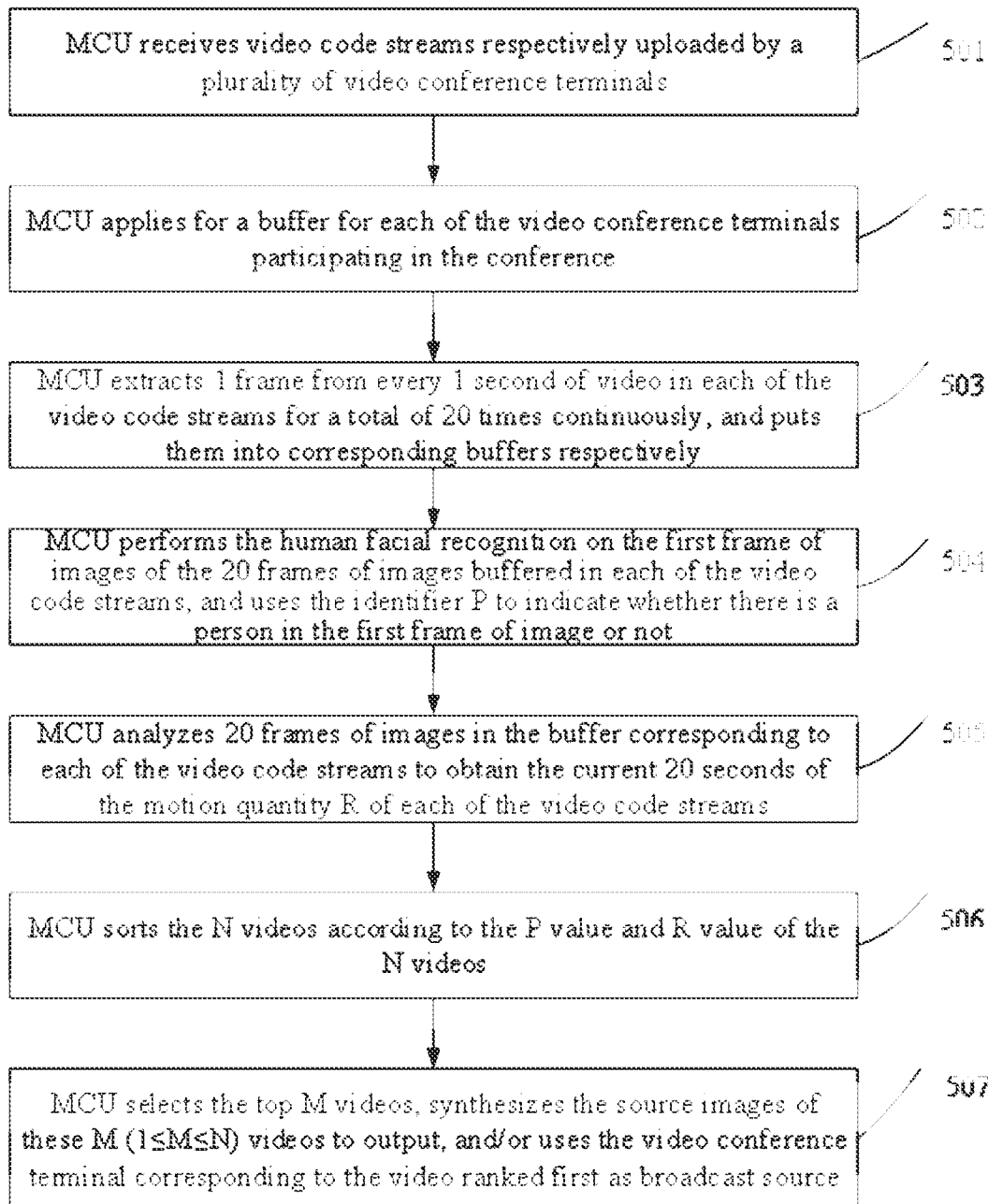
FIG. 5 is a schematic flowchart illustrating a video control method according to an embodiment of this application.

FIG. 5 is a schematic flowchart illustrating a video control method according to an embodiment of this application. As shown in FIG. 5, the method comprises:

Step 501: the MCU receives video code streams respectively uploaded by a plurality of video conference terminals;

In one embodiment, the MCU has established a multi-point video conference connection with each of the video conference terminals before receiving video code streams respectively sent by the plurality of video conference terminals.

In this embodiment, there are N sub-venues in total, and videos of the N sub-venues are input to the MCU.

Step 502: the MCU applies for a buffer for each of the video conference terminals participating in the conference;

In the third embodiment, a buffer that is capable of storing at least 20 frames of images is required. Therefore, the MCU can apply for a buffer that is capable of buffering 20 frames of images for each participating terminal.

The above steps 501 and 502 do not have a fixed sequence. The MCU may apply for a buffer, which is capable of saving at least 20 frames of images, for each sub-venue, at the beginning of joining a multi-point video conference. The MCU may also temporarily apply for a buffer that is capable of saving at least 20 frames during the multi-point video conference for each sub-venue.

Step 503: the MCU extracts 1 frame from every 1 second of video in each of the video code streams for a total of 20 times continuously, and puts them into corresponding buffers respectively;

In the third embodiment, for each of the video code streams, the YUV data before encoding may be collected and 1 frame may be extracted from every 1 second of video and put into the buffer, such operation may be performed for 20 times, and thus a total of 20 frames of images are put into the buffer;

Step 504: the MCU performs the human facial recognition on the first frame of images of the 20 frames of images buffered in each of the video code streams, and uses the identifier P to indicate whether there is a person in the first frame of image or not;

In one embodiment, the human facial recognition may be performed on one or more of the buffered 20 frames of images. In the third embodiment, the human facial recognition is performed on the first frame of image, and the existing human facial recognition algorithm may be used to perform the human facial recognition on the first frame of images. The specific recognition process is known in the art, which will not be repeated herein.

Specifically, if there is a person in the first frame of images, P=1, otherwise P=0;

In one embodiment, when the human facial recognition is performed on a plurality of frames of the buffered 20 images, if there is a person in any one of the plurality of frames of images, it is determined that there is a person in the N frames of images, and P=1; and if there is no person in any one of the plurality of frames of images, it is determined that there is no person in the N frames of images, and P=0.

Step 505: the MCU analyzes 20 frames of images in the buffer corresponding to each of the video code streams to obtain the current 20 seconds of the motion quantity R of each of the video code streams;

Various existing motion calculation algorithms may be used to calculate the motion quantity of the video code stream. For example, in the third embodiment, the specific process for calculating the motion quantity R may include:

calculating, in blocks, sad values of two YUV image blocks (this block may be an image block of m*m size). The sad value refers to the sum of the absolute value of the difference between the values of two image blocks at the same pixel. The average value R of the sad values of each two adjacent frames of images in the 20 frames of images stored in the buffer is calculated in blocks. The larger the R value is, the greater the 20 seconds of motion quantity of the image is.

Step 506: the MCU sorts the N videos according to the P value and R value of the N videos;

The rules for sorting include: the video code stream having a person therein is ranked higher than the video code stream having no person therein; if each of the video code streams has a person therein, the higher the value of the motion quantity R is, the higher the rank is.

In this embodiment, the rules for sorting include: the video in which P=1 is ranked higher than the video in which P=0, that is to say, the video having a person therein is ranked higher than the video having no person therein. If all videos have a person therein, the R values are compared, and the higher the R value is, the higher the rank is.

In step 507, the MCU selects the top M videos, synthesizes the source images of these M (1≤M≤N) videos to output, and/or uses the video conference terminal corresponding to the video ranked first as the broadcast source.

In the technical solution provided by the embodiments of this application, in the multi-point video conference, the MCU or cloud server can intelligently synthesize and output the top M video code streams without manual inspection selection; or take the video code stream ranked first as the broadcast source without manual intervention during video control, which is easy to operate, reduces the complexity of human operations, increases the efficiency of video control, improves the user experience and avoids the disorganized management of the conference venues.

Figure 6:
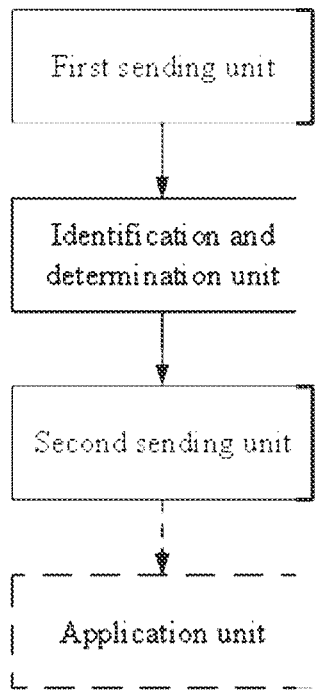
FIG. 6 is a structural diagram illustrating a video conference terminal according to an embodiment of this application.

The embodiments of this application provide a video conference terminal. FIG. 6 is a structural diagram of a video conference terminal according to an embodiment of this application. As shown in FIG. 6, the video conference terminal comprises:

a first sending unit configured to upload a video code stream to a multi-point control unit (MCU);

an identification and determination unit configured to perform human facial recognition on the video code stream and determine a motion quantity R of the video code stream, and use an identifier P to indicate whether there is a person in the video code stream or not;

a second sending unit configured to send the identifier P and the motion quantity R of the video code stream to the MCU, such that the MCU can perform video synthesis and output and/or select a broadcast source.

In one embodiment, the identification and determination unit comprises:

an identification unit configured to extract N frames of images from the video code stream and saving them in a buffer; perform the human facial recognition on the N frames of images, and use the identifier P to indicate whether there is a person in the N frames of images or not;

a determining unit configured to determine the motion quantity R of the corresponding video code stream according to the N frames of images.

In one embodiment, extracting N frames of images from the video code stream comprises: extracting y frames from every x seconds of video in the video code stream for z times continuously, where y*z=N, and x, y and z are all natural numbers greater than or equal to 1.

In one embodiment, performing the human facial recognition on the N frames of images comprises:

performing the human facial recognition on one or more of the N frames of images, and if there is a person in any one of the one or more of the frames of images, determining that there is a person in the N frames of images; if there is no person in any one of the one or more of the frames of images, determining that there is no person in the N frames of images.

Using the identifier P to indicate whether there is a person in the N frames of images or not comprises:

if there is a person in the N frames of images, assigning a value of 1 to the identifier P of the video code stream, and if there is no person in the N frames of images, assigning a value of 0 to the identifier P.

Determining, according to the N frames of images, the motion quantity R of the video code stream corresponding thereto comprises:

analyzing the N frames of images buffered in the buffer to obtain x*z seconds of the motion quantity of the video code stream, as the motion quantity R of the video code stream.

The video conference terminal further comprises:

an application unit configured to apply for a buffer that is capable of saving the N frames of images before extracting N frames of images from the video code stream and saving them in the buffer.

Figure 7:
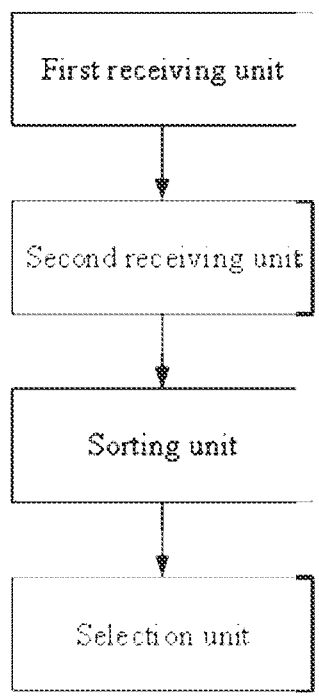
FIG. 7 is a structural diagram illustrating a multi-point control unit (MCU) according to an embodiment of the application.

The embodiments of the present application provide a multi-point control unit (MCU). FIG. 7 is a structural diagram illustrating a multi-point control unit (MCU) according to an embodiment of the application. As shown in FIG. 7, the multi-point control unit (MCU) comprises:

a first receiving unit configured to receive video code streams respectively sent by a plurality of video conference terminals;

a second receiving unit configured to receive identifiers P and motion quantities R respectively corresponding to the video code streams sent by the plurality of video conference terminals, the identifier P indicating whether there is a person in the corresponding video code stream or not;

a sorting unit configured to sort the identifiers P and the motion quantities R respectively corresponding to a plurality of video code streams;

a selection unit configured to select the video code streams corresponding to the video conference terminals ranked top M for synthesis and output, and/or select a video conference terminal corresponding to a video code stream ranked first as a broadcast source.

Rules for the sorting include: the video code stream having a person therein is ranked higher than the video code stream having no person therein; if each of the video code streams has a person therein, the higher the value of the motion quantity R is, the higher the rank is.

Specifically, if there is a person in the video code stream, P=1; if there is no person in the video code stream, P=. In this way, the sorting rules may include: the video code stream in which P=1 is ranked higher than the video code stream in which P=; if P=1 for all of the video code streams, the higher the value of R is, the higher the rank is.

Figure 8:
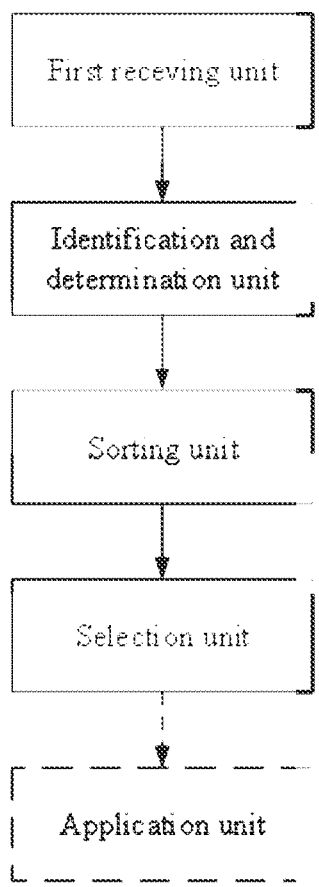
FIG. 8 is a structural diagram illustrating a multi-point control unit (MCU) according to an embodiment of the application.

The eighth embodiment of the present application provides a multi-point control unit (MCU). FIG. 8 is a structural diagram illustrating a multi-point control unit (MCU) according to an embodiment of the application. As shown in FIG. 8, the multi-point control unit (MCU) comprises:

a first receiving unit configured to receive video code streams respectively uploaded by a plurality of video conference terminals;

a recognition and determination unit configured to perform human facial recognition on each of uploaded video code stream and determine a motion quantity R of each of the video code streams, where each of the video code streams uses its own identifier P to indicate whether there is a person in the video code stream or not;

a sorting unit configured to sort the identifiers P and the motion quantities R respectively corresponding to a plurality of video code streams;

a selection unit configured to select the video code streams ranked top M for synthesis and output and/or select a video conference terminal corresponding to a video code stream ranked first as a broadcast source.

In one embodiment, the identification and determination unit comprises:

a recognition unit configured to extract N frames of images from each of the video code streams and save them in a buffer; perform human facial recognition on the N frames of images, and use the identifier P to indicate whether there is a person or not in the N frames of images or not;

a determining unit configured to determine the motion quantity R of the corresponding video code stream according to the N frames of images.

Extracting N frames of images from each of the video code streams comprises:

extracting y frames from every x seconds of video in each of the video code streams for z times continuously, where y*z=N, and x, y and z are all positive integers.

Performing the human facial recognition on the N frames of images comprises:

performing the human facial recognition on one or more of the N frames of images, and if there is a person in any one of the one or more of the frames of images, determining that there is a person in the N frames of images; if there is no person in any one of the one or more of the frames of images, determining that there is no person in the N frames of images.

In one embodiment, using the identifier P to indicate whether there is a person in the N frames of images or not comprising:

if there is a person in the N frames of images, assigning a value of 1 to the identifier P of the video code stream, and if there is no person in the N frames of images, assigning a value of 0 to the identifier P.

In one embodiment, determining, according to the N frames of images, the motion quantity R of the video code stream corresponding thereto comprises:

analyzing the buffered N frames of images to obtain x*z seconds of the motion quantity of the corresponding video code stream, as the motion quantity R of the corresponding video code stream.

In one embodiment, rules for the sorting include: the video code stream having a person therein is ranked higher than the video code stream having no person therein; if each of the video code streams has a person therein, the higher the value of the motion quantity R is, the higher the rank is.

Specifically, if there is a person in the video code stream, P=1; if there is no person in the video code stream, P=0. In this way, the rules for sorting may include: the video code stream in which P=1 is ranked higher than the video code stream in which P=0; if P=1 for all of the video code streams, the higher the value of R is, the higher the rank is.

In one embodiment, the MCU further comprises:
an application unit configured to apply for a buffer that is capable of saving the N frames of images for each of the video conference terminals, before extracting N frames of images from each of the video code streams and saving them in the buffer.

In the technical solution provided by the above embodiments, the MCU or cloud server can intelligently synthesize and output the top M video code streams without manual inspection selection; or take the video code stream ranked first as the broadcast source without manual intervention, which is easy to operate, reduces the complexity of human operations, increases the efficiency of video control, improves the user experience and avoids the disorganized management of the conference venue.

The embodiments of the present application also provide a video conference terminal, comprising a memory, a processor, and a computer program stored on the memory and run on the processor, when executed by the processor, the computer program implements any one of the video control methods implemented by the video conference terminal.

The embodiments of the present application also provide a multi-point control unit (MCU), comprising a memory, a processor, and a computer program stored on the memory and run on the processor, when executed by the processor, the computer program implements any one of the video control methods implemented by the multi-point control unit (MCU).

The embodiments of the present application also provide a computer-readable storage medium storing an information processing program that, when executed by a processor, implements any one of the above video control steps.

It will be appreciated by those skilled in the art that all or some of the steps in the methods, functional modules/units in the system and apparatus disclosed above may be implemented as software, firmware, hardware, and appropriate combinations thereof. In hardware implementations, the division between functional modules/units mentioned in the above description does not necessarily correspond to the division of physical components; for example, one physical component may have a plurality of functions, or one function or step may be cooperatively executed by several physical components. Some or all components may be implemented as software executed by a processor, such as a digital signal processor or a microprocessor, or as hardware, or as an integrated circuit, such as an application specific integrated circuit. Such software may be distributed on a computer-readable medium, and the computer-readable medium may comprise a computer storage medium (or non-transitory medium) and a communication medium (or transitory medium). As is well known to those skilled in the art, the term computer storage medium comprises volatile and non-volatile, removable and non-removable media implemented in any method or technology for storing information (such as computer-readable instruction, data structure, program module, or other data). Computer storage media comprise, but are not limited to, Random Access Memory (RAM), Read-Only Memory (ROM), Electrically Erasable Programmable Read-Only Memory (EEPROM), Flash memory or other storage technologies, Compact Disc Read-Only Memory (CD-ROM), Digital Video Disc (DVD) or other optical storage, magnetic cassette, magnetic tape, disk storage or other magnetic storage or any other medium that can be used to store desired information and be accessed by a computer. In addition, as is well known to those skilled in the art, communication media usually contain computer-readable instruction, data structure, program module, or other data in a modulated data signal such as carrier waves or other transmission mechanism, and may comprise any information delivery media.

Although the implementations disclosed in this application are as described above, the content described is only the implementations used to facilitate the understanding of the application, and is not intended to limit the application. Anyone skilled in the art to which this application belongs, without departing from the spirit and scope disclosed in this application, can make any modifications and changes in the implementation form and details, but the scope of patent protection of this application still falls in the scope defined by the appended claims.

What is claimed is:

1. A video control method applied to a video conference terminal, comprising:
uploading a video code stream to a multi-point control unit (MCU);
performing human facial recognition on the video code stream and determining a motion quantity R of the video code stream, and using an identifier P to indicate whether there is a person in the video code stream or not; and
sending the identifier P and the motion quantity R of the video code stream to the MCU, such that the MCU performs video synthesis and output, and/or selects a broadcast source by sorting the identifier P and the motion quantities R respectively corresponding to the video code streams,
wherein rules for the sorting include: a video code stream having a person therein is ranked higher than a video code stream having no person therein; if each of the video code streams has a person therein, the higher the value of the motion quantity R is, the higher the rank is.

2. The video control method of claim 1, wherein performing the human facial recognition on the video code stream and determining the motion quantity R of the video code stream comprises:
extracting N frames of images from the video code stream and saving them in a buffer;
performing the human facial recognition on the N frames of images, and using the identifier P to indicate whether there is a person in the N frames of images or not;
determining, according to the N frames of images, the motion quantity R of the video code stream corresponding thereto.

3. The video control method of claim 2, wherein extracting the N frames of images from the video code stream comprises:
extracting y frames from every x seconds of video in the video code stream for z times continuously, wherein y*z=N, and x, y and z are all natural numbers greater than or equal to 1.

4. The video control method of claim 3, wherein determining, according to the N frames of images, the motion quantity R of the video code stream corresponding thereto comprises:

analyzing the N frames of images buffered in the buffer to obtain x*z seconds of the motion quantity of the video code stream, as the motion quantity R of the video code stream.

5. The video control method of claim 2, wherein performing the human facial recognition on the N frames of images comprises:
   performing the human facial recognition on one or more of the N frames of images, and if there is a person in any one of the one or more of the frames of images, determining that there is a person in the N frames of images; and if there is no person in any one of the one or more of the frames of images, determining that there is no person in the N frames of images.

6. The video control method of claim 5, wherein using the identifier P to indicate whether there is a person in the N frames of images or not comprises:
   if there is a person in the N frames of images, assigning a value of 1 to the identifier P of the video code stream, and if there is no person in the N frames of images, assigning a value of 0 to the identifier P.

7. The video control method of claim 2, wherein, before extracting the N frames of images from the video code stream and saving them in the buffer, the method further comprises:
   applying for a buffer that is capable of saving N frames of images.

8. A video control method applied to a multi-point control unit (MCU), comprising:
   receiving video code streams respectively sent by a plurality of video conference terminals;
   receiving identifiers P and motion quantities R respectively corresponding to the video code streams sent by the plurality of video conference terminals, the identifier P indicating whether there is a person in the corresponding video code stream or not; and
   sorting the video code streams according to the identifiers P and the motion quantities R respectively corresponding to the video code streams, and selecting video code streams corresponding to the video conference terminals ranked top M for synthesis and output, and/or selecting a video conference terminal corresponding to a video code stream ranked first as a broadcast source,
   wherein rules for the sorting include: a video code stream having a person therein is ranked higher than a video code stream having no person therein; if each of the video code streams has a person therein, the higher the value of the motion quantity R is, the higher the rank is.

9. A video control method applied to a multi-point control unit (MCU), comprising:
   receiving video code streams respectively uploaded by a plurality of video conference terminals;
   performing human facial recognition on each of the uploaded video code streams and determining a motion quantity R for each of the video code streams, wherein each of the video code streams uses its own identifier P to indicate whether there is a person in the video code stream or not; and
   sorting the video code streams according to the identifiers P and the motion quantities R respectively corresponding to the video code streams, and selecting video code streams ranked top M for synthesis and output, and/or selecting a video conference terminal corresponding to a video code stream ranked first as a broadcast source,
   wherein rules for the sorting include: a video code stream having a person therein is ranked higher than a video code stream having no person therein; if each of the video code streams has a person therein, the higher the value of the motion quantity R is, the higher the rank is.

10. The video control method of claim 9, wherein performing the human facial recognition on each of the uploaded video code streams and determining the motion quantity R for each of the video code streams comprises:
   extracting N frames of images from each of the video code streams and saving them in a buffer;
   performing the human facial recognition on the N frames of images, and using the identifier P to indicate whether there is a person in the N frames of images or not;
   determining, according to the N frames of images, the motion quantity R of the video code stream corresponding thereto.

11. The video control method of claim 10, wherein extracting the N frames of images from each of the video code streams comprises:
   extracting y frames from every x seconds of video in each of the video code streams for z times continuously, wherein y*z=N, and x, y and z are all positive integers.

12. The video control method of claim 11, wherein determining, according to the N frames of images, the motion quantity R of the video code stream corresponding thereto comprises:
   analyzing buffered N frames of images to obtain x*z seconds of the motion quantity of the corresponding video code stream, as the motion quantity R of the corresponding video code stream.

13. The video control method of claim 10, wherein, before extracting the N frames of images from each of the video code streams and saving them in the buffer, the method further comprises:
   applying for a buffer that is capable of saving the N frames of images for each of the video conference terminals.

14. The video control method of claim 10, wherein performing the human facial recognition on the N frames of images comprises:
   performing the human facial recognition on one or more of the N frames of images, and if there is a person in any one of the one or more of the frames of images, determining that there is a person in the N frames of images; and if there is no person in any one of the one or more of the frames of images, determining that there is no person in the N frames of images.

15. The video control method of claim 14, wherein using the identifier P to indicate whether there is a person in the N frames of images or not comprises:
   if there is a person in the N frames of images, assigning a value of 1 to the identifier P of the video code stream, and if there is no person in the N frames of images, assigning a value of 0 to the identifier P.

16. The video control method of claim 15, wherein rules for the sorting include: ranking a video code stream in which P=1 higher than a video code stream in which P=0; and ranking a first video code stream higher than a second video code stream if P=1 for each of the first and second video code streams and the first video code stream has a higher value of R than that of the second video code stream.

* * * * *